(12) United States Patent
Yang et al.

(10) Patent No.: US 9,109,935 B2
(45) Date of Patent: Aug. 18, 2015

(54) MEMS UTILITY METERS WITH INTEGRATED MASS FLOW SENSORS

(71) Applicants:Xiangyou Yang, Chengdu (CN); Yong Feng, Chengdu (CN); Sugang Jiang, Chengdu (CN); Chih-Chang Chen, Cupertino, CA (US); Liji Huang, San Jose, CA (US)

(72) Inventors: Xiangyou Yang, Chengdu (CN); Yong Feng, Chengdu (CN); Sugang Jiang, Chengdu (CN); Chih-Chang Chen, Cupertino, CA (US); Liji Huang, San Jose, CA (US)

(73) Assignee: M-Tech Instrument Corporation (holding) Limited, Hong Kong (HK)

( * ) Notice: Subject to any disclaimer, the term of this patent is extended or adjusted under 35 U.S.C. 154(b) by 0 days.

(21) Appl. No.: 13/662,523

(22) Filed: Oct. 28, 2012

(65) Prior Publication Data

US 2014/0116129 A1    May 1, 2014

Related U.S. Application Data

(60) Provisional application No. 61/554,930, filed on Nov. 2, 2011.

(51) Int. Cl.
*G01F 1/68* (2006.01)
*G01F 1/684* (2006.01)
*G01F 25/00* (2006.01)
*G01F 15/00* (2006.01)

(52) U.S. Cl.
CPC ............ *G01F 1/6845* (2013.01); *G01F 1/6842* (2013.01); *G01F 15/00* (2013.01); *G01F 25/0007* (2013.01)

(58) Field of Classification Search
CPC .................................... G01F 1/68; G01F 1/44
USPC ....................................................... 73/204.22
See application file for complete search history.

(56) References Cited

U.S. PATENT DOCUMENTS

| | | | | |
|---|---|---|---|---|
| 2,943,484 | A * | 7/1960 | Harrington et al. | 73/197 |
| 7,717,000 | B2 * | 5/2010 | Xie et al. | 73/863.03 |
| 2009/0194719 | A1 * | 8/2009 | Mulligan | 251/129.01 |

* cited by examiner

*Primary Examiner* — Jewel V Thompson

(57) ABSTRACT

This invention is related to an apparatus which incorporates a microfabricated silicon mass flow sensor to measure city gas flow rate in a medium pressure range for utility industry which is dominated by conventional mechanical meters such as turbine and rotary meters. The microfabricated mass flow sensor is so called micro-electro-mechanical systems (a.k.a. MEMS) device. Due to the small feature size of micro scale for MEMS mass flow sensor, the invented apparatus includes many advantages such as low power consumption, compact package, high reliability and extended dynamic measurement range. This apparatus is also provided with a stable flow conditioning to achieve a desired dynamic range capability. Furthermore, because of the high accuracy characteristic, the apparatus in this invention could be applied for custody transfer or tariff in utility industry as well.

8 Claims, 3 Drawing Sheets

MEMS UTILITY METERS WITH INTEGRATED MASS FLOW SENSORS

Figure 1:
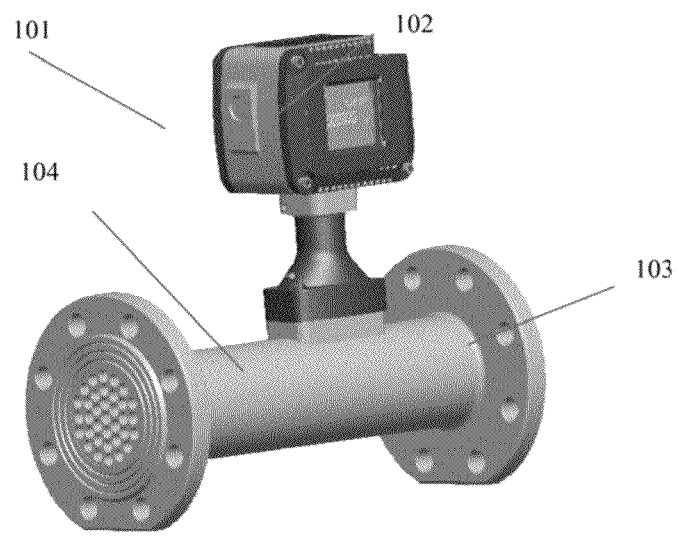

We claim the priority to U.S. provisional application Ser. No. 61/554,930, filed on Nov. 2, 2011.

BACKGROUND OF THE INVENTION

City gas meters in the medium pressure range for custody transfer have been dominated by mechanical technology such as turbine or rotary meters. These meters have been on market for over 160 years enjoying excellent service, life and reliability. However, the turbine meter is greatly suffered from a small dynamic range while the rotary meter is quite vulnerable to the damage caused by floating particles in the flow medium. For the rotary meter, event it is only partially clogged or damaged by the floating particles; the meter would still be affected in terms of repeatability and accuracy of flow measurement. Once the rotary meters got completely clogged, the rotary meter will stop rotating and fail the functionality. In addition, these mechanical meters requires heavy maintenances services and an add-on flow computer to compensate the environment variation of pressure and temperature conditions which could naturally induce the volumetric changes of gas medium. The drawbacks of the flow computer is not only it is extremely pricey (more expensive than the meter itself in many cases) but also it adds additional metrology errors to the flow measurement. Since the early 1980s, many efforts have been made for a non-mechanical gas meter that shall have the capability to self-compensate the variation caused by temperature and pressure and the capability for remote data communication in a secure method. The commercially available non-mechanical gas meters comparative to mechanical meters are still rarely perceived, particularly for the medium pressure range city gas industrial and low pressure range commercial users.

Therefore, it is very desirable to have such new type of non-mechanical technology and take over the custody transfer for gas meters in medium pressure range, which is disclosed in current invention.

SUMMARY OF THE INVENTION

The present invention is related to a utility meter incorporated with an integrated microfabricated silicon mass flow sensor. The microfabricated silicon mass flow sensor is so called micro-electro-mechanical systems (a.k.a. MEMS) device. It is therefore an object of the present invention to provide such measuring apparatus with a silicon MEMS mass flow sensor applicable for the metrology of fluid system with significant advantages superior to other conventional mechanical meters. This object is reached by the disclosed independent claims.

In the present preferred embodiments, the silicon MEMS flow sensor is based on the principles of anemometry and calorimetry, and sometimes they are also called as silicon MEMS thermal mass flow sensor. The sensing elements of the flow sensors mainly comprise four serpentine-shape resistors which are usually made of same thin film materials. One of the resistors is built as a reference resistor to monitor the ambient temperature while another one of the resistors is functioned as a heater. In most of cases, the resistance of reference resistor is as better as many tunes than heater's to avoid the heating effect on the reference resistor. The heater resistor is elevated to a constant temperature blither than the ambient temperature. A Wheatstone bridge circuit consisting of the heater and reference resistor is designed to achieve constant temperature control of heater resistor.

Usually a MEMS silicon thermal flow sensor is incapable to provide the desired dynamical flow range with flow stability at the medium gas pressure range since the mass flow in principle will have a reduced dynamical measurement range with proportional to the increment of gas pressure. A straight pipe without additional flow conditioning will have undesired erratic measurement due to flow irregularities. Further, the maximum dynamic measurement range of calorimetric mass flow sensor shall be restrained by the boundary layer limitation. It is therefore the intension of this invention to provide a stable flow condition whilst having a desired dynamic range capability. Therewith, the current invention shall have properties in many aspects of differentiation include dynamic metrology capability, faster response, lengthy lifetime, easiness of integration and lower cost.

This meter shall have one pair of flanges as for pressurized pipe connection. The meter body which is also serves as the flow channel where the sensor probe assembly is inserted for metering. The flow channel is designed using a standard Venturi structure where the sensor probe assembly is positioned at the center of the smallest inner diameter along the Venturi structure to improve flow stability. Furthermore, two different flow conditioners are placed in series at the inlet end of the flow channel. The flow conditioner right at the inlet is a flow straightener; and the other one which is located at a distance 2~5 times of the pipe diameter from the inlet end is a flow profiler. The optimum distance for the flow profiler from the inlet end of flow channel is preferably at a length of 3 times of the pipe diameter. The sensor probe assembly shall have an electronic control board with as memory chip that can be used to store the calibration data as well as other metrology data with enhanced data security. This sensor assembly unit therefore can be independently performing the metrology task. The identical flow conditioning and configuration can provide that the meter body has the same construction such that the assembly can be recovered to its origin performance when it is replaced by other duplicated ones. The sensor assembly with its key component of an integrated MEMS chip has extended the measurement dynamic range using both the calorimetric and anemometric measurement principle. Such that the invented meter shall have an extended dynamic turn-down (measurement) ratio over 1000:1 depending on the calibration procedure. But in most cases it shall have a dynamic range of 100:1 for practical applications at a less calibration cost.

Another embodiment in the current invention is that the sensor assembly consists of a forced flow channel that has a diameter of one fourth to one eighth range of the pipe channel. One sixth of the pipe inner diameter for the forced flow channel is considered to be optimum. The sensor assembly inserted into the flow channel should be positioned such that the sensing element on the MEMS silicon mass flow sensor is at the center of the flow channel. This embodiment in the current invention shall then have the advantages to further constrain the flow into a uniform turbulence flow after passing through the flow profiler such that the sensing element, shall always measure the flow velocity in a same flow formality within the desired dynamic range. The current invention further shall have another advantage with more flexibility and tolerance for the sensor alignment to the central point of flow channel since the flow channel size of the meter assembly is much larger than the dimension of a microfabricated MEMS sensing element.

As for the city gas custody transfer and tariff applications, the current invention provides a solution for large dynamic range without the needs of temperature and pressure compensation since the MEMS thermal flow sensor is measuring the flow medium in a mass base instead of volume base. The sensor assembly package not just only provides enhanced flow stability but also an independent service unit which is easy for onsite service and maintenance.

BRIEF DESCRIPTIONS OF THE DRAWINGS

FIG. 1: The complete assembly view of utility gas meter

Figure 2:
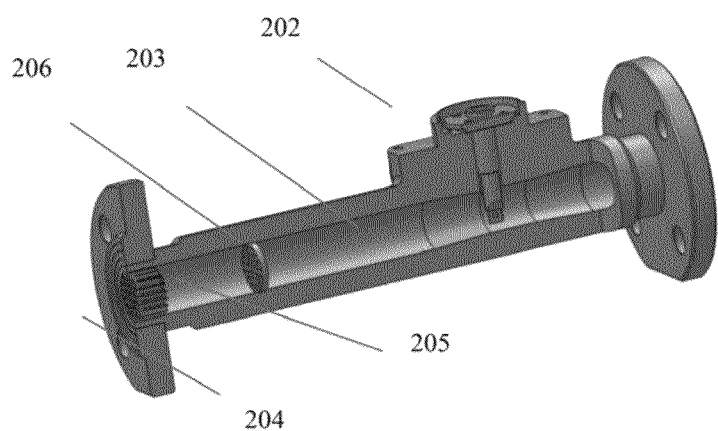

FIG. 2: The explosive view of the gas meter flow channel with a Venturi structure and one pair of flow conditioners.

Figure 3A:
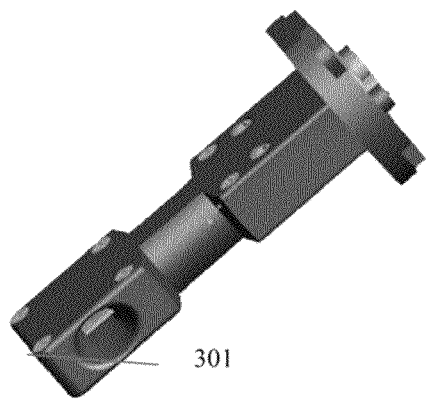

FIG. 3A: The complete view of the independent sensor assembly unit.

Figure 3B:
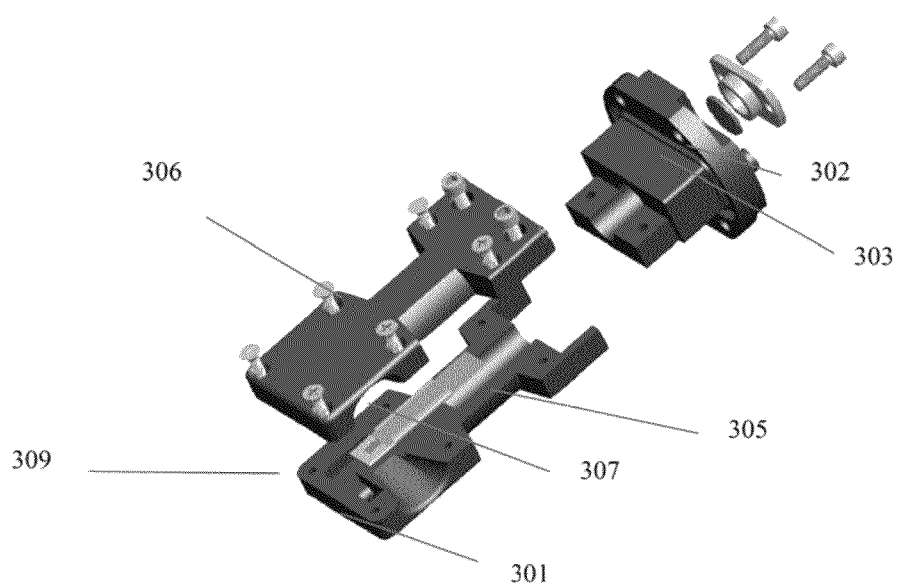

FIG. 3B: The explosive view of the independent sensor assembly unit.

Figure 4:
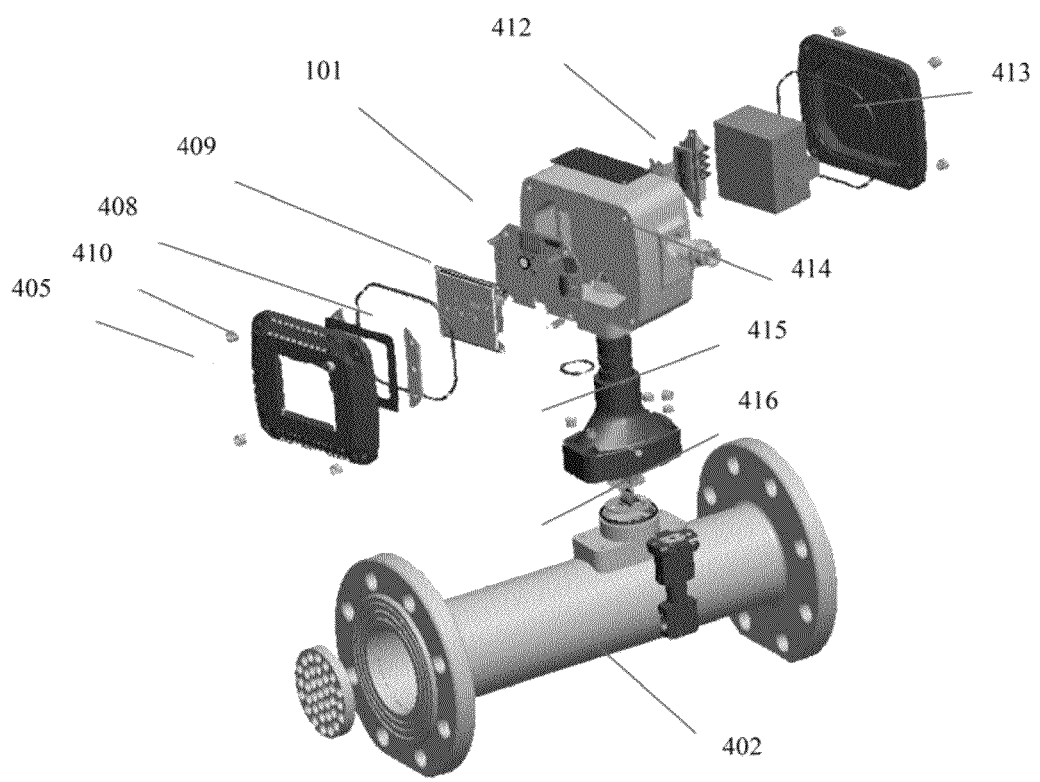

FIG. 4: Diagram of the electronic control for the gas meter and the final meter assembly.

DETAILED DESCRIPTION OF THE PREFERRED EMBODIMENTS

FIG. 1 illustrates a complete assembly view of the utility gas meter. The utility gas meter mainly composes of four major components: the meter head (101), the display (102), the connection flange (103), and the meter body (104).

FIG. 2 depicts a profile view for a pictorial illustration of the complete assembled utility gas meter without the meter head (101) and display (1102). Portion of the flow channel is built with a Venturi structure (203). In order to ensure the flow stability, two flow conditioners are installed in the flow channel. The one called flow straightener (204) is installed right in the inlet end of the flow channel (206); and the second one called flow profiler (205) is installed at a distance about 2~5 times of the pipe diameter from the inlet end. In the optimum situation, the location of the flow profiler is preferred to be at a distance of 3 times of the pipe diameter from the inlet end. The sensor probe assembly (202) is inserted into the Venturi structure (203) and positioned in the location with narrow pipe diameter along the Venturi structure.

FIG. 3A and FIG. 3B depicted a close view and explosive view of the complete sensor probe assembly (202). The sensor probe assembly (202) consists of a to flow channel cover (306) and a flow channel base (305). The MEMS silicon thermal mass flow sensor (309) is carried by a printed circuit board (307) which is secured in the flow channel base (305). A PCB hoard (303) with memory chips is utilized to control the MEMS chip and collect flow measurement data. The PCB board (303) is secured and sealed by a sealing fixture (302) with two bolts. The sensor probe assembly (202) consists of a sensing flow channel (301) which is surrounded the MEMS mass flow sensor and formed by a top cover and a bottom case. The sensing flow channel (301) has a diameter of one fourth to one eighth of the pipe inner diameter, and preferably one sixth of the diameter of the pipe inner diameter. The sensor probe assembly (202) inside the flow channel should be in a preferable position such that the sensing element of the MEMS flow sensor at the circle center of the flow channel.

In FIG. 4, it shows the explosive view of the complete utility gas meter. The utility meter is powered by a lithium ion battery (412) with capacity of 38 ampere-hours which would serve the meter in a field for over 10 years since the MEMS mass flow sensor assemblies is very low power consumption. Furthermore, combined with other control electronics, the whole apparatus totally only requires few hundred anerowatts. The service life of current invented utility meter is comparable to that of the current mechanical utility meter.

A metal connection block (415) is used to connect the meter head (101) to the meter body (104). The meter head (101) contains two separate chambers: the front chamber house is for the LCD display (410), the display control printed circuit board (408), and the mail printed circuit board (409) for the control electronics of the meter; while the had chamber house provides the space for battery pack (412) and the battery control circuit board (414). The battery pack is connected to the meter electronics via the battery connector and sealed with rubber gasket and covered with the battery pack cover (413). The design of separate battery housing had benefited the easiness of battery change.

The main printed circuit hoard (409) includes a microcontroller, analog to digital converter (ADC), amplifier, power regulator, and memory chip for data storage. The function of the data storage includes the storage of the meter calibration data from origin manufacturer and the measurement and operation data from end users. During the meter operation, the total volume accumulation, instant flow rate, flow medium temperature and pressure, battery life status etc. will be registered and stored in the memory chip. The liquid crystal display (410) will also provide the user aforementioned information in real time while the information can be stored and retrieved afterwards. Since the utility meter will serve in many extreme climate conditions; it would prefer that the LCD can perform at a wider operation temperature range.

We claim:

1. A utility gas meter comprising:
a gas sensor probe assembly consisting of a sensing flow channel which is formed by a sensing flow channel top cover and a sensing flow channel bottom base, a MEMS thermal mass flow sensor which is carried by a first printed circuit board, and a connector body which is used to connect the first printed circuit board (carried the MEMS thermal mass flow sensor) and a second printed circuit board to control the MEMS thermal mass flow sensor; wherein the sensing flow channel has a diameter of one fourth to one eighth of inner diameter of the flow channel; wherein the first printed circuit board is secured on the sensing flow channel bottom base; and wherein the second printed circuit board is equipped with a memory chip to collect measurement data;
a gas meter body consisting of a flow channel, two flow conditioners and two metal flange for gas pipe connection; wherein portion of the flow channel is a Venturi structure and the gas sensor probe assembly is inserted into the Venturi structure and positioned at a location with narrowest pipe inner diameter along the flow channel direction; and wherein the position of the MEMS thermal mass flow sensor is placed at the center along the direction which is perpendicular to the flow channel; and
a gas meter head consisting of a front chamber and a back chamber; wherein the front chamber is utilized to house a display, a display control circuit board, and a main circuit board; wherein the back chamber is utilized to house a battery, and a battery control circuit board.

2. The utility gas meter of claim 1 wherein the first flow conditioner is a flow straightener which is installed right in an inlet end of the flow channel; and wherein the second flow conditioner is a flow profiler which is installed at a distance about 2~5 times of inner diameter at the flow channel from the inlet end of the flow channel.

3. The utility gas meter of claim 1 wherein the main circuit hoard includes a microcontroller, an analog to digital convert, an amplifiers, a power regulator, and a memory chip for data storage.

4. The utility gas meter of claim 1 wherein during the utility gas meter operation, total volume accumulation, instant flow rate, flow medium temperature and pressure, and battery status will be registered and stored in the memory chip of the main circuit board in the meter head.

5. The utility gas meter of claim 1 wherein the display will provide user measurement information such as total volume accumulation, instant flow rate, flow medium temperature and pressure, and battery status in real time while the information can be stored and retrieved afterwards from the memory chip.

6. The utility gas meter of claim 1 wherein the utility gas meter with an integrated MEMS thermal mass flow sensor has an extended measurement dynamic turn-down ratio over 1000:1 depending on the calibration procedure.

7. The utility gas meter of claim 1 wherein the utility gas meter only requires power consumption of less than 400 hundred microwatts due to low power consumption characteristic of MEMS thermal mass flow sensor.

8. The utility gas meter of claim 7 wherein the utility gas meter have a service life over 10 years with a battery capacity of 38 ampere-hours.

\* \* \* \* \*